United States Patent [19]

Lawrence et al.

[11] Patent Number: 5,387,427
[45] Date of Patent: Feb. 7, 1995

[54] INLAID DAIRY PRODUCTS AND PROCESSES

[75] Inventors: Jeanette Lawrence, Parlin; Antoine F. Coutant, Jersey City; Frederick Swayhoover, Kendall Park, all of N.J.

[73] Assignee: Rhone-Poulenc Specialty Chemicals Co., Cranbury, N.J.

[21] Appl. No.: 998,216

[22] Filed: Dec. 30, 1992

[51] Int. Cl.[6] ............... A23L 1/0532; A23L 1/072; A23C 9/137
[52] U.S. Cl. ............... 426/573; 426/580; 426/583; 426/658
[58] Field of Search ............... 426/573, 658, 580, 583

[56] References Cited

U.S. PATENT DOCUMENTS

| | | |
|---|---|---|
| 3,955,009 | 5/1976 | Eskritt et al. . |
| 4,046,925 | 9/1977 | Igoe . |
| 4,058,636 | 11/1977 | Igoe . |
| 4,100,304 | 7/1978 | Getman . |
| 4,117,172 | 9/1978 | Bradshaw et al. . |
| 4,310,559 | 1/1982 | Mita et al. . |
| 4,479,973 | 10/1984 | Holley . |
| 4,647,470 | 3/1987 | Sanderson et al. . |
| 4,717,571 | 1/1988 | Okomogi et al. . |
| 4,746,528 | 5/1988 | Prest et al. ............... 426/580 |
| 4,956,185 | 9/1990 | Cajigas . |
| 5,145,697 | 9/1992 | Cajigas . |
| 5,145,698 | 9/1992 | Cajigas . |

OTHER PUBLICATIONS

Arbuckle, W. S., *Ice Cream* 4th Ed. An Avi Book, Van Nostrand Reinhold Co. 1986 pp. 24, 24 and 27.
Kirk Othmer Encyclopedia of Chem. Tech. 3rd Ed., vol. 15 p. 565 John Wiley & Sons Inc. 1981.

Primary Examiner—Donald E. Czaja
Assistant Examiner—Mary S. Mims
Attorney, Agent, or Firm—John A. Shedden

[57] ABSTRACT

A composite milk product is prepared by mixing into the semi-solid or solid milk product particles of a gel having a solids content of 2 to 14% and containing a major amount of xanthan and locust bean gums prepared to simulate the texture of gelatin.

11 Claims, No Drawings

INLAID DAIRY PRODUCTS AND PROCESSES

The present invention relates to a dairy product and more particularly to dairy products containing soft inlays of substantially non-melting low solids hydrocolloid gels designed to simulate the texture of gelatin but not to dissolve and/or leak color and flavor into the dairy product when subjected to elevated temperature and to processes for preparing such inlays and resulting dairy products.

DESCRIPTION OF THE PRIOR ART

It is known to make composite ice cream, yogurt or other dairy products wherein more than 5% of the dairy products volume comprises visible particles of cocoa, fruit, nut meats, candy, bakery products, liquor, spices and the like. W. S. Arbuckle, *Ice Cream*, Fourth Edition, An Avi Book, Van Nostrand Reinhold Company, 1986 at pp. 24 and 25.

It is also known that Federal Ice Cream Standards allow optional hydrocolloid stabilizers including agaragar, algin, gelatin, gum acacia, guar seed gum, gum karaya, locust bean gum, oat gum, gum tragacanth, carrageenan, lecithin, psyllium seed husk, and sodium carboxymethyl cellulose, Ibid, p. 27.

U.S. Pat. No. 4,100,304, teaches a process for forming a frozen confection from ice cream, ice milk or aerated marshmallow filled with hard inlays such as nut meats, fruit pieces, candied fruit and the like.

U.S. Pat. No. 3,955,009, employs 0.1 to 2% by weight hydrocolloid gum added to increase the viscosity of a yogurt product when reconstituted with milk.

U.S. Pat. No. 4,117,172, teaches preparing simulated goose berries, grapes, cherries and black currants having a firm exterior and a relatively fluid core. Alginate is used to gel the simulated fruit.

U.S. Pat. No. 4,717,571, to Okonogi, et al., teaches solid or semisolid dessert products such as jelly, pudding, yogurt and the like where the liquid materials used for base and one or more high solids sauces contain an assortment of two or more kinds of gelling agents such as gelatin, agar, furcellaran, carrageenan, low methoxy pectin and a mixture of locust bean gum and xanthan gum. Example 2 discloses yogurt containing a gel paste of a mixture of 37% solids containing locust bean gum, xanthan gum and low methoxy pectin and other food ingredients which is cooled to give a yogurt base product having jelly pieces.

U.S. Pat. No. 4,647,470, to Sanderson, et al., teaches blends of low-acetyl gellan gum, a brittle gelling agent, with xanthan and locust bean gum to provide a diversity of gel textures which find particular utility in gelled food formulations. A dessert gel of about 15% solids and an aspic or jelly of less than 2% solids is disclosed in Examples 13 and 14 each using 3 to 5 times as much gellan gum as either of xanthan and locust bean gum in preparing products using the three gums.

U.S. Pat. No. 4,046,925, U.S. Pat. No. 4,058,636 and U.S. Pat. No. 4,479,973, each teach gelled milk products containing gums including xanthan and locust bean gum.

U.S. Pat. No. 4,310,559, to Mita, et al., teaches granules of ice stabilized by gums including gelatin, xanthan and locust bean gum used in frozen milk based confections.

Kirk and Othmer, Encyclopedia of Chemical Technology, Third Edition, Vol. 15, p. 564, John Wiley and Sons, Inc. (1981) describes yogurt as milk fermented with *Lactobacillus bulgaricus* and *Streptococcus thermophilous* and describes its manufacture which is similar to buttermilk.

We have found that gelatin cannot be used with semisolid milk products because while its softness, low solids content and smooth texture in the mouth is a target in preparing the gels of this invention, the gelatin melts into the milk product when it is subjected to warm storage conditions i.e. gelatin does not provide a sufficient barrier to avoid color and flavor bleeding into the dairy product. High solids content gels made with hydrocolloids cannot be used because they lack softness and have a candy-like texture, flavor and mouthfeel.

SUMMARY OF THE INVENTION

We have found that certain hydrocolloids can be combined to form a soft, low solids, substantially non-melting gel which simulates gelatin but does not dissolve or adversely color or flavor aqueous semi-solid milk products. The gel is incorporated in the milk product to simulate the texture of fruit pieces or other soft inlays.

A mixture of hydrocolloids containing a major amount of xanthan gum and a mannan or galacto-mannan such as locust bean gum in 2 to 14% solids gel has been found to give excellent simulated fruit or gelatin texture when incorporated in semi-solid milk products such as yogurt, particularly gels sweetened in part using an intensive sweetener. These systems have been found to be surprisingly, highly efficient at preventing the bleeding of colors and flavors from the gel into the dairy product.

DETAILED DESCRIPTION OF THE INVENTION

Initial products prepared using pieces of gelled commercially available fruit flavored gelatin of about 15% solids were used to simulate fruit pieces in refrigerated yogurt giving an excellent textured product. The gelatin had a soft, yielding texture or mouthfeel which was very pleasing but unfortunately melted and dissolved when the yogurt was subjected to warm storage conditions e.g. ambient or room temperatures for only about two hours. In contrast, under refrigerated conditions i.e. about 40° F., there had been no migration of color or phases after two weeks.

We have replaced the gelatin with a substantially non-melting hydrocolloid gel having somewhat lower solids content. Total solids contents of the aqueous gel may range from 2 to 20%, preferably 2 to 14%. When mono and disaccharides are used for all sweetness, the solids content of the gel normally is maintained at from about 3 to 14, preferably 8 to 14% of the gel. When intensive sweetener is employed, with or without bulking agents, the solids content can be lowered giving a softer gel from about 2 to 14%, preferably 3 to 12% of the gel.

Any mono, di or polysaccharide may be employed as a bulking agent for the gel. Monosaccharides such as fructose and dextrose, disaccharides such as sucrose, polysaccharides such as polydextrose and other saccharides such as dextrins can be used. Sugar alcohols such as sorbitol, mannitol and the like may also be used for bulking. In general, any art recognized bulking agent can be employed for its known use.

Intensive sweeteners such as aspartame, saccharine, acyl sulfam k, cyclamate and the like may be used.

Usually from 1 to 10% of the total solids is intensive sweetener, preferably from 0.01 to 0.5% of the water containing gel.

The acidity of the gel inlay is obtained by use of acid and acid salts, tartaric acid, gluconic acid, citric acid and the like. Metal salts of acids such as alkali and alkaline earth metal phosphates, chlorides, citrates and other inorganic and organic acid salts may be employed. Generally from 1 to 10% of the gel solids is acid, preferably 2 to 8% and from 1 to 10% of the gel solids is one or more acid salts. One or more acids or acid salts may be combined for their art recognized function.

The metal salts and the milk content of the final product provides monovalent and divalent cations which are reactive with many of the hydrocolloids typically used for form gels and should be balanced in the final solid or semisolid food not to overly toughen the premade soft hydrocolloid gel.

An important aspect of this invention, is to prepare a substantially non-melting, soft aqueous hydrocolloid gel that simulates in semi-solid milk products, the texture of pieces of gelatin dessert such as those well known JELL-O brand fruit gelatins.

We have found a blend of from 1:10 to 10:1 of xanthan gum to locust bean gum gives good simulation of gelatin texture either alone or in combination with other hydrocolloids such as agar, furcellaran, carrageenan, low methoxy pectin, and the like and, serendipitously, gives a gel which does not bleed color or flavor into semi-solid milk products when incorporated into them even at warm e.g. ambient temperatures. A particularly preferred combination of locust bean gum and xanthan as a major component of the hydrocolloid, is a mixture of locust bean gum and xanthan at proportion of 2:1 to 1:2, preferably about 1:1. By major amount we mean the xanthan and locust bean gum mixture should comprise at least 50% of all hydrocolloids employed, preferably 70% and most preferably be the only hydrocolloids used.

A preferred embodiment of this invention is to prepare soft aqueous hydrocolloid gels which simulate the texture of gelatin when incorporated into semi-solid milk products. A soft gel gelatin control is determined by preparing a JELL-O brand fruit gelatin product following package directions and incorporating 2 parts of such gelatin in subdivided state in 3 parts commercially available plain yogurt. Gels of this invention are then prepared, subdivided in the same manner to the same particle size, and incorporated in the same proportions in the same yogurt. The products are then tasted to determine similarity to each other. Triangular testing can be employed to determine observable difference, if any, or other known panel techniques may be employed. These products may also be stored and the storage temperature elevated to determine resistance to melting or change with storage time. By elevated temperature we mean temperatures from 60° F. up to those often reached during summer shipment or storage and during use in tropical climates i.e. about 145° F.

A particularly preferred embodiment of this invention is preparations of gels employing at least one intensive sweetener. This allows the solids content of the gel to be lowered to 2 to 12%, preferably 7 to 11%. The low solids content provides a softness and nervousness in the gel which is not obtained using total solids contents above 14%.

The gel of this invention can be prepared by blending together the following ingredients:

|  | Solids % | Preferred % |
| --- | --- | --- |
| Hydrocolloid | 1–20 | 10–20 |
| Organic acid | 1–10 | 2–8 |
| Metal acid salt | 1–10 | 2–8 |
| Bulking agent | 50–99 | 50–90 |
| Intensive sweetener | 0–5 | 2–4 |
| Flavor, color, preservative | up to 10 | 1–10 |
| Total | 100 | 100 |

The ingredients are well blended and added to hot water 190° to 210° F. with mechanical agitation and mixed for a period of time (up to 60 minutes) sufficient to hydrate the hydrocolloid and dissolve all the solids. The mixture is cooled to about 120° to 130° F. where color and flavor are added. The mixture is well blended, placed in receptacles for gelatin and cooled to set the gel. The gel is next broken or cut into desired size and blended into the milk product to obtain the final product of this invention.

A typical composition of the aqueous gel is:

|  | Usable Parts | Preferred |
| --- | --- | --- |
| Gum | 0.8–3.0 | 1.0–2.0 |
| Organic acid | 0.1–1.0 | 0.2–0.8 |
| Metal acid salt | 0–1.0 | 0.1–1.0 |
| Bulking agent | 3.0–20.0 | 3.0–14.0 |
| Intensive sweetener | 0–0.6 | 0.1–0.4 |
| Color and flavor | 0.1–5.0 | 0.1–5.0 |
| Water | to 100 parts provided total solids not to exceed 14% | to 100 parts provided total solids not to exceed 14% |

In the aqueous gels of this invention, the xanthan/mannan and/or galacto-mannan comprises from 0.8 to 3.0% by weight of the aqueous gel, preferably from 1.0% to 2.0%.

The gel may be blended at ratios of 1:10 to 3:1 gel: milk product, although we prefer ratios of 1:5 to 1:1 and most preferably about 2 parts gel to 3 parts milk product. A preferred Composition is as follows:

|  | % | Range of Ingredients % |
| --- | --- | --- |
| Xanthan | 0.5 | 0.4–0.75 |
| Locust bean gum | 0.5 | 0.4–0.75 |
| Organic acid | 0.4 | 0.1–1.0 |
| Metal acid salts | 0.2 | 0.1–1.0 |
| Bulking agent | 5.0 | 3.0–14.0 |
| Aspartame | 0.2 | 0.1–0.4 |
| Color and flavor | 2.1 | 0.1–5.0 |
| Water | to 100% | to 100% with the proviso that the solids content of the gel does not exceed 14% |

In a most preferred embodiment, a 50—50 blend of xanthan and locust bean gum is blended with fumaric acid, sodium citrate or other acid salts, a bulking agent such as dextrose and aspartame. The mixture is dissolved in hot water cooled and flavor and color added. After homogenous blending, the mixture is covered and cooled overnight in a refrigerator. The resulting gel is broken up and stirred into yogurt at a ratio of 3 parts yogurt, 2 parts gel.

If desired, the gel can be formed into predetermined shape either by cooling in molds, deposit of the fluid gel on a cold surface, by setting in cold atmosphere or with the use of cations. Taking advantage of the inherent distinctiveness and stability of the gels, in this invention, in an especially preferred embodiment, the gel is formed into specific identifiable shapes such as animals, geometric configurations, etc. prior to blending into the dairy product.

The invention is further illustrated by the following examples which are not intended to limit the invention.

EXAMPLE 1

| Base Mix | Parts | | | |
|---|---|---|---|---|
| Sugar | 93.50 | | | |
| Citric Acid | 0.40 | | | |
| Disodium phosphate | 0.05 | | | |
| Color | 0.08 | | | |
| potassium sorbate | 1.00 | | | |

| Gum Mix | A | B | C | D | E |
|---|---|---|---|---|---|
| Carrageenan | — | — | 4.0 | 5.0 | 2.5 |
| Locust bean gum | 5.0 | 3.3 | 3.4 | 5.0 | 2.5 |
| Xanthan | 5.0 | 3.4 | — | — | — |
| U-150* | — | 3.3 | — | — | — |

*UNIGUAR - a trademark of Rhône-Poulenc for guar gum

Four cups of water (1000 parts) of 80° C. water was used to disperse the gum mix by stirring at 300 rpm for 3 to 5 minutes. The remaining dry ingredients (base mix) were added and well mixed to dissolve. The resulting mixture cooled in a refrigerator at 40° F. overnight. The gels were broken up in an Oster brand mixer (#2 setting) using 3 passes. Forty percent gel was mixed with 60% commercial plain yogurt. A Jell-O brand gelatin fruit flavored dessert control was prepared following label directions, subdivided as the other gels and mixed into the same yogurt at the same proportion as the gels.

The sample prepared using 5 grams of locust bean gum and 5 grams of xanthan (sample A) had a softness and the best mouthfeel with the gel dissipating in the mouth in a manner similar to the gelatin control but having a more distinct and improved mouthfeel. Samples B through E were also observed to slightly bleed color into the yogurt.

EXAMPLE 2

| | Sample - parts per 100 parts | | | |
|---|---|---|---|---|
| Ingredient | A | B | C | D |
| Xanthan | 0.5 | 0.5 | 0.5 | 0.25 |
| Locust bean gum | 0.5 | 0.5 | 0.5 | 0.25 |
| Fumaric acid | 0.1 | 0.1 | 0.1 | 0.1 |
| Sodium citrate | 0.1 | 0.1 | 0.2 | 0.1 |
| Dextrose | — | 15.0 | 5.0 | 5.0 |
| Aspartame | 0.015 | 0.015 | 0.03 | 0.06 |
| Color and flavor | 0.01 | 0.01 | 0.01 | 0.02 |
| Water | 100.0 | 100.0 | 100.0 | 100.0 |
| pH of gel | 3.79 | 3.80 | 3.80 | 3.66 |

A control was prepared from Jell-O brand fruit gelatin by adding 45.5 grams of gelatin to 1830 grams water at 200°, dissolving and cooling to 120° where flavor and color were added and the product cooled overnight to form a gel. The samples A to D were prepared. The control had typical gelatin characteristics in that it is rigid and breaks up and partially dissolves gently in the mouth. Samples A, B and C were slightly brittle and rubbery and seemed to lack flavor. Sample D was as rigid as control and not as rubbery as A to C and had a color, texture and flavor closest to control. However, control showed leakage of color and flavor when broken up in yogurt as in Example 1 and when placed at 70° F. for 48 hours while D showed no significant leakage during 72 hours at 70° F. under similar conditions.

EXAMPLE 3

| Ingredient | A | B | C |
|---|---|---|---|
| Xanthan | 0.5 | 0.35 | 0.25 |
| Locust bean gum | 0.5 | 0.35 | 0.25 |
| Fumaric acid | 0.2 | 0.2 | 0.2 |
| Sodium citrate | 0.2 | 0.2 | 0.2 |
| Dextrose | 5.0 | 5.0 | 5.0 |
| Aspartame | 0.15 | 0.15 | 0.15 |
| Color and flavor | trace | trace | trace |
| Water | 100.0 | 100.0 | 100.0 |

Control and samples A to C were prepared as in Example 2. When the control was sampled in yogurt there was not enough mouthfeel and chew and the gelatin pieces were not distinct. The control colored the yogurt. Samples A and B were found to have the best mouthfeel, with A the preferred. The pieces were distinct in the yogurt and, while a little rubbery, the flavor released better. Sample C did not have distinct pieces.

Samples A through C of the instant invention, while having a too-rubbery consistency when eaten alone, surprisingly, if blended in yogurt and eaten, have a mouthfeel much like that realized by eating e.g. brand JELL-O brand fruit flavored gelatin. Furthermore, unlike commercial gelatin, the pieces remain distinct in the yogurt, i.e. do not bleed or dissolve into the yogurt under normal storage temperatures i.e. they all showed good stability at 70° F. during 48 hours.

EXAMPLE 4

| Gums | 1 | 2 | 3 | 4 | 5 | 6 | 7 |
|---|---|---|---|---|---|---|---|
| Xanthan | – | 0.25 | – | – | – | 0.2 | 0.25 |
| Locust bean gum | – | 0.25 | – | – | – | 0.2 | 0.25 |
| Sodium alginate | 0.3 | 0.1 | – | – | 1.0 | 0.1 | 0.5 |
| Low methoxy pectin | – | – | – | 1.0 | – | – | – |
| Carrageenan | – | – | 1.0 | – | – | 0.025 | – |
| $CaCl_2$ | 0.05 | 0.05 | – | 0.05 | 0.05 | 0.05 | 0.1 |
| Evaluation | No Set | Medium Set | Rapid Set | Medium Set | No Set | Medium Set | Good Firm Set |

The above gum systems were evaluated in a gel containing 0.4 parts fumaric acid, 0.2 parts sodium citrate, 5.0 parts dextrose, 0.2 parts aspartame in 100 parts water prepared as in the previous examples.

EXAMPLE 5

| | % | % |
|---|---|---|
| Xanthan | 0.5 | 0.5 |
| Locust bean gum | 0.5 | 0.5 |
| Fumaric acid | 0.4 | 0.5 |
| Sodium citrate | 0.2 | 0.2 |
| Dextrose | 25.0 | 5.0 |
| Aspartame | 0.2 | 0.2 |
| Sodium chloride | 0.4 | 0.4 |
| Water | to 100.0 | to 100.0 |

The above formulas were dissolved in hot water, cooled to form a gel and the gel subdivided and evaluated in yogurt as previously described. There did not seem to be a significant improvement in reducing color migration by adding more dextrose bulking agent. The gel, at 25% solids, was less like control and not preferred.

EXAMPLE 6

A hydrocolloid blend is prepared from the following composition:

|  | GMS | % |
| --- | --- | --- |
| Xanthan | 5.0 | 6.94 |
| Locust bean gum | 5.0 | 6.94 |
| Fumaric acid | 4.0 | 5.56 |
| Sodium citrate | 2.0 | 2.78 |
| Dextrose | 50.0 | 69.44 |
| Aspartame | 2.0 | 2.78 |
| Calcium chloride | 2.0 | 5.56 |
| Total | 72.0 | 100.00 |

The above 72 grams of well blended materials was added with the mechanical agitation to 1000 grams of 190° F. water and mixed for 10 minutes in a jacket kettle at 190° F. The mixture was next cooled in a waterbath using hand stirring to about 120° to 130° F. 21 grams of color and flavor were added and well mixed with mechanical agitation into the warm aqueous mixture. The stirrer was removed from the warm mix, the kettle covered with Saran Wrap and placed in a refrigerated area at 40° F.

The following morning the gel was broken into pieces of the desired size using a Osterizer brand mixer. The pieces were hand stirred with a finished commercially available Axelrod brand non-fat, plain yogurt at a 60:40 ratio of yogurt to broken gel pieces. After 48 hours at room temperature there was little migration of color into the yogurt and the gel pieces were distinct in the yogurt as a second phase. After two weeks at refrigerated conditions, there was no migration of color and the gel pieces were distinct.

EXAMPLE 7

Hydrocolloid blends are prepared from the following compositions.

|  | A (%) | B (%) | C (%) |
| --- | --- | --- | --- |
| Sugar | 15.0 | 15.0 | 15.0 |
| Orange Juice (Tropicana) | 20.0 | 20.0 | 20.0 |
| Citric Acid | 0.2 | 0.2 | 0.2 |
| Xanthan | 0.1 | – | 0.4 |
| Locust Bean Gum | 0.1 | – | 0.4 |
| LM Pectin | 0.9 | 0.9 | – |
| Water | 63.70 | 63.90 | 64.00 |
| Total | 100.0 | 100.00 | 100.00 |

All of the dry ingredients were dispersed at room temperature at 500 rpm into the liquids until dissolved. The resulting liquid was heated in a steam table at 90° C. and held at that temperature for 10 minutes. The mixture was then cooled to 20° C. and refrigerated overnight. The next day, samples were observed for gelling. Samples A and C were blended with yogurt at a 60:40 yogurt to gel ratio.

Sample A did not produce a firm gel but rather had a very lively type of set. When stirred into the yogurt it completely disperses into the yogurt to yield a grainy, cereal type texture with no distinct pieces discernable. Sample A is typical of the "sauce" corporation (Example 2, Table 17) of OKONOGI et al U.S. Pat. No. 4,717,571.

Sample B did not set at all but rather remained in the fluid state and therefore was not blended with the yogurt.

Sample C made a good firm gel and when the pieces were stirred into the yogurt, the pieces remained distinct for extended periods of time at room temperature.

What is claimed is:

1. A solid or semi-solid milk product composite comprising milk product and distinct pieces or inlays of a subdivided gel, in a ratio of 1:10 to 3:1 gel to milk product, said gel having 2–14% solids and comprising from 0.8 to 3.0% of xanthan gum and mannan or galacto-mannan gum in a ratio of 1:10 to 10:1; 0.1 to 1.0% of organic acid and/or salt thereof; 0 to 1.0% metal acid salt; 3.0 to 20.0% bulking agent; and water, all of the percentages being weight percentages based on the total aqueous gel weight.

2. The product of claim 1 wherein the gum is present from 1.0 to 2.0%; the organic acid and/or salts thereof is present from 0.2 to 0.8%; the metal acid salt is present from 0.1 to 1.0%; and the bulking agent is present from 3.0 to 14.0%.

3. The product of claim 1 further containing an intensive sweetener.

4. The product of claim 3 wherein the sweetener is present from 0.1 to 0.6%.

5. The product of claim 1 wherein the solids level is from 3–12%.

6. The product of claim 3 wherein the gel comprises xanthan gum and locust bean gum; the organic acid is fumaric acid; the bulking agent is mono-, di-, or poly saccharide; and the intensive sweetener is aspartame.

7. The product of claim 1 wherein the distinct pieces or inlays of said subdivided gel is resistant to dissolution in said milk product at from 60° F. to 145° F.

8. A process for preparing a solid or semi-solid milk product composite comprising:
 a) heating and mixing until dissolution from 0.8 to 3.0% of a gum mix comprising xanthan gum and mannan or galacto-mannan gum in a ratio of 1:10 to 10:1, 0.1 to 1.0% of organic acid and/or a salt thereof, 0 to 1.0% metal acid salt, 3.0 to 20.0% bulking agent, and water, all of the percentages being weight percentages based on the total aqueous mixture weight;
 b) cooling and solidifying said aqueous mixture;
 c) subdividing said solid aqueous mixture into distinct pieces or inlays;
 d) incorporating said distinct pieces or inlays in a milk product in a parts ratio of 1:10 to 3:1 pieces or inlays: milk product to form the solid or semi-solid milk product composite.

9. The process of claim 8 wherein said aqueous mixture additionally contains an intensive sweetener.

10. The process of claim 9 wherein
 i) the gum is present from 1.0 to 2.0%;
 ii) the organic acid and.or salts thereof is present from 0.2 to 0.8%;
 iii) the metal acid salt is present from 0.1 to 1.0%;
 iv) the bulking agent is present from 3.0 to 14.0%; and
 v) the intensive sweetener is present from 0.1 to 0.6%.

11. The process of claim 9 wherein
 i) the gum comprises a mixture of xanthan gum and locust bean gum;
 ii) the organic acid is fumaric acid;
 iii) the bulking agent is mono-, di-, or poly saccharide; and
 iv) the intensive sweetener is aspartame.

* * * * *